United States Patent [19]

Iizuka

[11] Patent Number: 5,410,476
[45] Date of Patent: Apr. 25, 1995

[54] OPERATION MODE CONTROL SYSTEM FOR USE IN AUTOMATIC POWER TRANSMISSION FOR SELECTIVELY HALTING EXECUTION OF HOLD MODE

[75] Inventor: Naonori Iizuka, Shizuoka, Japan

[73] Assignee: Jatco Corporation, Japan

[21] Appl. No.: 579,578

[22] Filed: Sep. 10, 1990

[30] Foreign Application Priority Data

Sep. 11, 1989 [JP] Japan ................... 1-235988

[51] Int. Cl.$^6$ .......................................... B60K 17/06
[52] U.S. Cl. ................. 364/424.1; 477/120; 477/125; 477/138
[58] Field of Search ............ 364/424.1, 424.04; 74/862, 866, 878; 477/115, 120, 121, 125, 127, 138

[56] References Cited

U.S. PATENT DOCUMENTS

| | | | |
|---|---|---|---|
| 4,846,022 | 7/1989 | Ito et al. ................. | 74/866 |
| 4,858,498 | 8/1989 | Bouda ..................... | 74/866 |
| 4,913,006 | 4/1990 | Tsuyama et al. ........ | 74/866 |
| 4,984,484 | 1/1991 | Fujiwara et al. ........ | 74/866 |
| 5,001,943 | 3/1991 | Fujita ..................... | 74/866 |
| 5,022,287 | 6/1991 | Murano et al. .......... | 74/866 |

FOREIGN PATENT DOCUMENTS

| | | |
|---|---|---|
| 0117399 | 1/1984 | European Pat. Off. . |
| 0171770 | 8/1985 | European Pat. Off. . |
| 55-129647 | 10/1980 | Japan . |
| 62-13848 | 1/1987 | Japan . |
| 62-17457 | 1/1987 | Japan . |

*Primary Examiner*—Kevin J. Teska
*Assistant Examiner*—Collin W. Park
*Attorney, Agent, or Firm*—Ronald P. Kananen

[57] ABSTRACT

An operation mode control system for an automatic automotive power transmission includes a manually operable mode selection switch for selecting an operation mode from among economy, power, and hold modes. When an acceleration demand magnitude is larger than a criterion value while the hold mode is selected, the execution of the hold mode is suspended. This suspension of the hold mode execution is automatically released without operating the manually operable mode selection switch when certain conditions are reached. The power mode may be executed in place of the hold mode during the suspension of the hold mode execution.

8 Claims, 3 Drawing Sheets

OPERATION MODE CONTROL SYSTEM FOR USE IN AUTOMATIC POWER TRANSMISSION FOR SELECTIVELY HALTING EXECUTION OF HOLD MODE

BACKGROUND OF THE INVENTION

1. Field of the Invention

The present invention relates generally to an operation mode control system for an automatic power transmission in an automotive vehicle. More specifically, the present invention relates to an operation mode control system for an automatic automotive power transmission having a hold mode which is selective by a driver, wherein execution of the selected hold mode is suspended when a vehicular acceleration is required by the driver while the hold mode is selected by the driver.

2. Description of the Background Art

Operation mode control systems for automatic automotive power transmissions are known, such as the ones disclosed in Japanese First Patent Publications Nos. 62-17457 published on Jan. 26, 1987 and 62-13848 published on Jan. 22, 1987.

In the system of the former publication, once the hold mode is selected by a vehicle driver, a gear position is fixed corresponding to a gearshift lever position even when acceleration is demanded by the driver while the hold mode is selected. Accordingly, in order to attain a required acceleration response, the hold mode should be released by the driver before depressing an accelerator.

On the other hand, in the system of the latter publication, either an economy mode or a power mode is executed in place of the hold mode when the magnitude of an acceleration demand is larger than a preset value while the hold mode is selected by a driver's operation of a manual operation mode selection switch. Specifically, when the acceleration demand magnitude is larger than the preset value while the hold mode is selected, the economy mode or the power mode, whichever was selected at the time of the selection of the hold mode, is automatically selected and continues to be executed until one of the other modes is selected by the driver.

In this latter publication, however, since the economy mode in which a gear shift is scheduled in an economical point of view, or the power mode in which a gear shift is scheduled in view of output characteristics, is automatically selected according to the operation mode which was selected at the time of the selection of the hold mode, if the economy mode is automatically selected, the acceleration response inevitably becomes less than when the power mode is selected. Since the acceleration demand magnitude is larger than the preset value, the automatic selection of the economy mode is not preferable. Further, in this system, although the driver selected the hold mode according to a traffic condition, a road condition, or the like, this selection is automatically shifted to the selection of the economy mode or the power mode just by an incidental or accidental rapid depression of the accelerator. As a result, the driver must operate the manual operation mode selection switch to return to the hold mode.

SUMMARY OF THE INVENTION

Therefore, it is an object of the present invention to provide an operation mode control system for an automatic power transmission that can eliminate the above-noted defects inherent in the background art.

It is another object of the present invention to provide an operation mode control system for an automatic power transmission, wherein execution of a hold mode is suspended when an acceleration demand magnitude is larger than a criterion value while a hold mode is manually selected with an operation mode selection switch, and wherein the suspension of the hold mode execution is automatically released without operating the operation mode selection switch when conditions are reached.

It is a further object of the present invention to provide an operation mode control system for an automatic power transmission, wherein a power mode is automatically executed in place of a hold mode when an acceleration demand magnitude is larger than a criterion value while a hold mode is manually selected.

To accomplish the above-mentioned and other objects, according to one aspect of the present invention, an operation mode control system for an automatic power transmission comprises:

a manually operable mode selection switch for selecting a hold mode in which a gear shift is not effected by a monitored engine load indicative parameter;

first means for deriving an acceleration demand magnitude while the hold mode is selected by the manually operable mode selection switch, the acceleration demand magnitude being derived from a variation in the monitored engine load indicative parameter;

second means for comparing the acceleration demand magnitude with a criterion value, the second means produing a first decision when the acceleration demand magnitude is larger than the criterion value and a second decision when the acceleration demand magnitude is not more than the criterion value;

third means for suspending execution of the hold mode when the first decision is produced by the second means; and fourth means for releasing the suspension when the second decision is produced by the second means.

According to another aspect of the present invention, an operation mode control system for an automatic power transmission comprises:

a manually operable mode selection switch for selecting an operation mode from among a hold mode, in which a gear shift is not effected by a monitored engine load indicative parameter, an economy mode, in which a gear shift is controlled based on the monitored engine load indicative parameter and a monitored vehicle speed indicative parameter, and a power mode, in which a gear shift is controlled based on the engine load indicative parameter and the monitored vehicle speed indicative parameter, the power mode allowing the gear shift at a higher vehicle speed than the economy mode;

first means for deriving an acceleration demand magnitude while the hold mode is selected by the manually operable mode selection switch, the acceleration demand magnitude being derived from a variation in the monitored engine load indicative parameter;

second means for comparing the acceleration demand magnitude with a criterion value, the second means producing a first decision when the acceleration demand magnitude is larger than the criterion value and a second decision when the acceleration demand magnitude is not more than the criterion value;

third means for executing the power mode when the first decision is produced by the second means;

fourth means for executing the hold mode when the second decision is produced by the second means.

BRIEF DESCRIPTION OF THE DRAWINGS

The present invention will be understood more fully from the detailed description given hereinbelow and from the accompanying drawings of the preferred embodiment of the invention, which are given by way of example only, and are not intended to limit the present invention.

In the drawings.

DESCRIPTION OF THE PREFERRED EMBODIMENT

Figure 1:
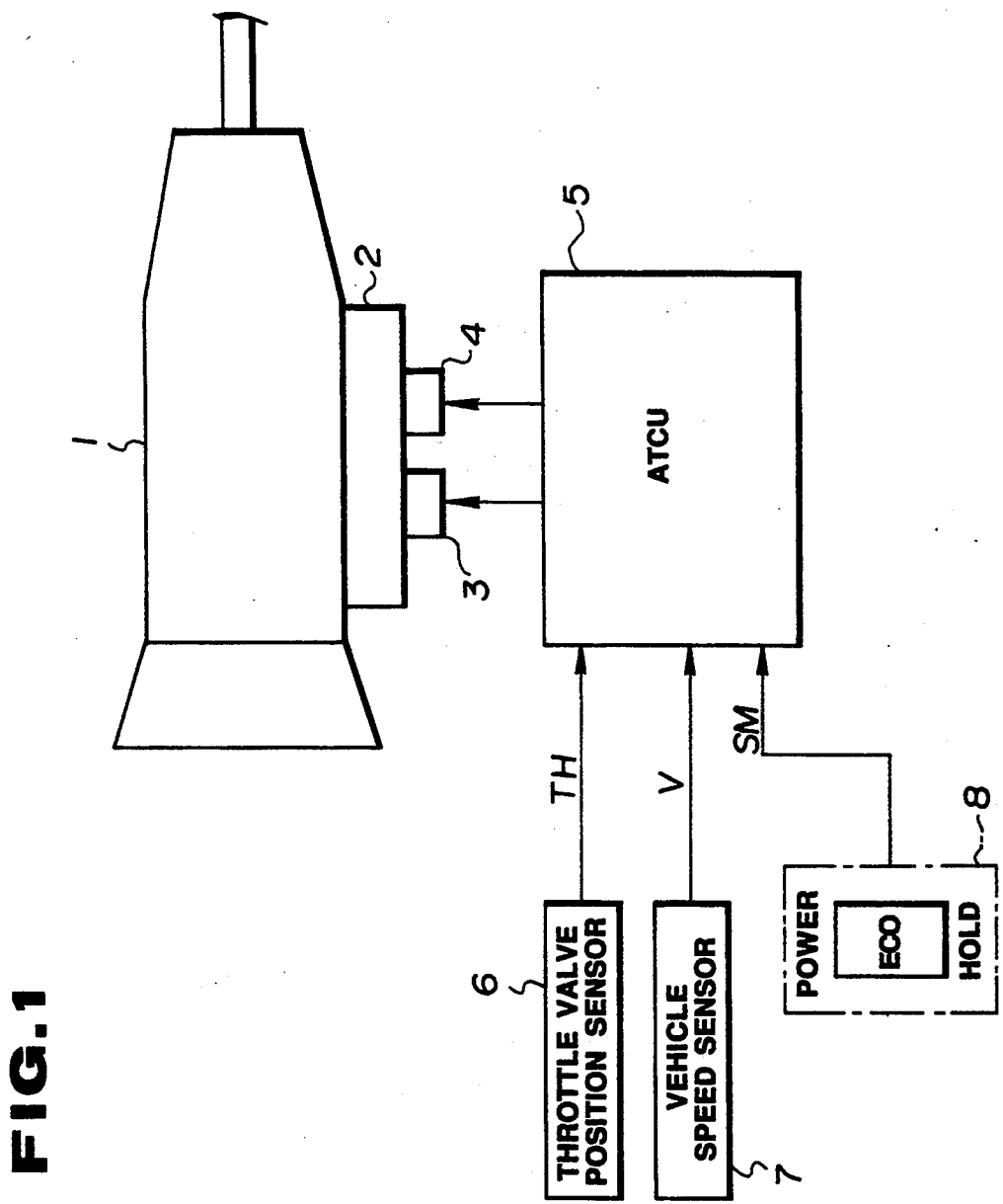
FIG. 1 is a schematic view showing an overall structure of an operation mode control system for an automatic automotive power transmission according to a preferred embodiment of the present invention.

Referring now to the drawings, a preferred embodiment of an operation mode control system for an automatic automotive power transmission according to the present invention will be described with reference to FIGS. 1 to 5.

Figure 2:
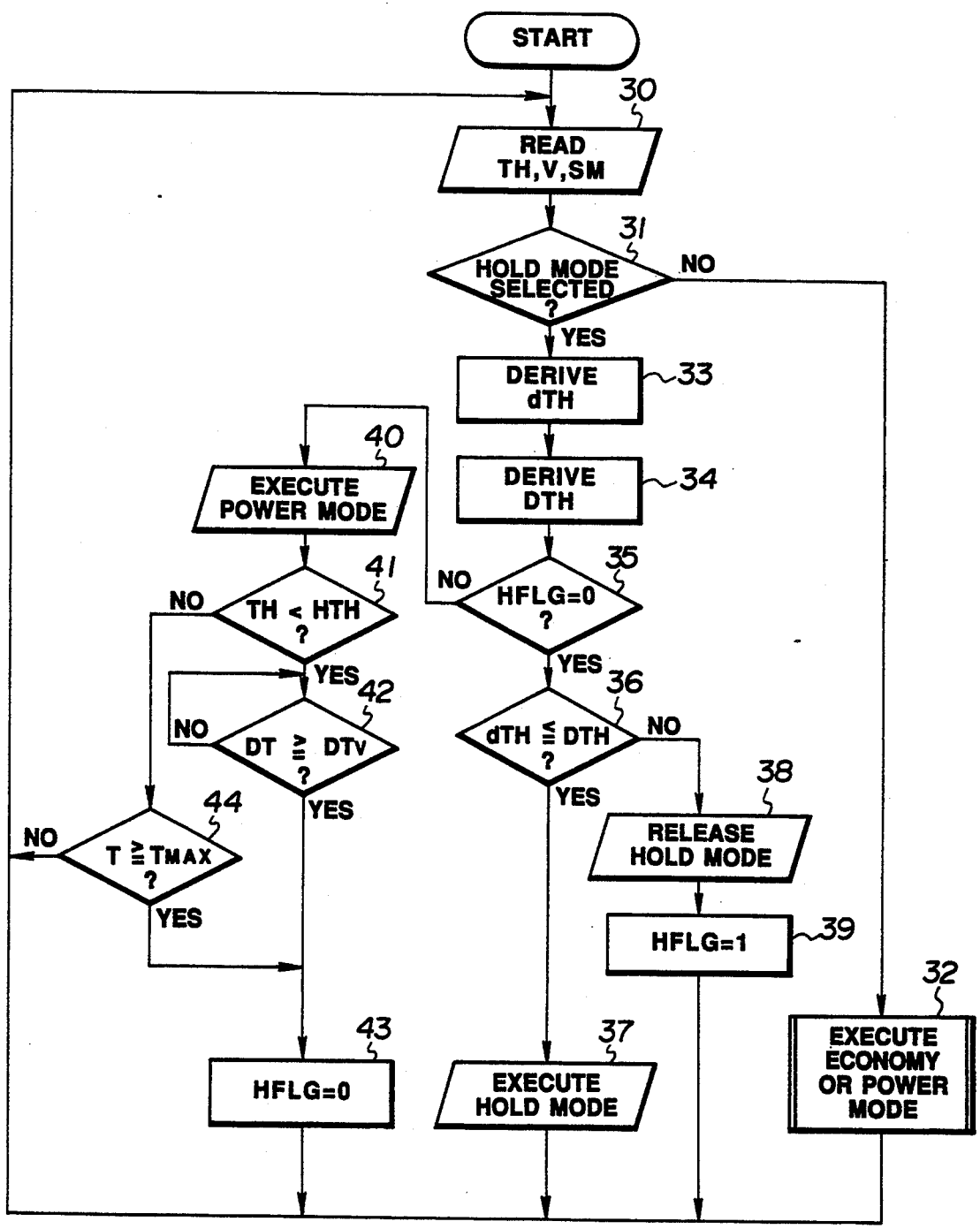
FIG. 2 is a flowchart of an operation mode control routine to be executed by ATCU in the preferred embodiment of FIG. 1.

FIG. 1 shows an overall schematic structure of the operation mode control system according to the preferred embodiment. In FIG. 1, the system includes an automatic power transmission 1 having a gear train with four forward speed drives and one reverse drive, and a hydraulic pressure control unit 2 generating a control hydraulic pressure. The control hydraulic pressure is selectively fed to various frictional elements for the gear train according to control signals supplied to, for example, first and second shift solenoid valves 3 and 4 from an automatic transmission control unit (ATCU) 5. The system further includes a throttle valve position sensor 6 producing a signal indicative of a throttle valve angular position, or a throttle valve opening degree TH (engine load), a vehicle speed sensor 7 producing a signal indicative of a vehicle speed V, and a manual operation mode selection switch 8 producing a signal indicative of a selected mode SM, which may be an economy mode, a power mode, or a hold mode. These signals are fed to the ATCU 5 to be processed according to stored programs including an operation mode control routine as shown in FIG. 2.

Figure 3:
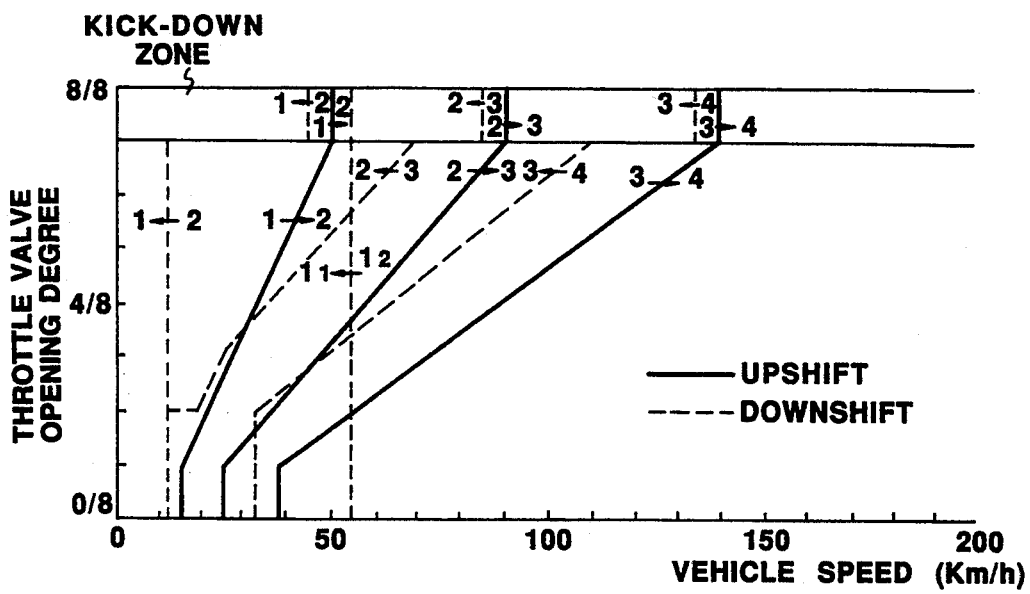
FIG. 3 is a vehicle speed-versus-throttle valve opening degree graph showing a gear shift schedule for an economy mode.
Figure 4:
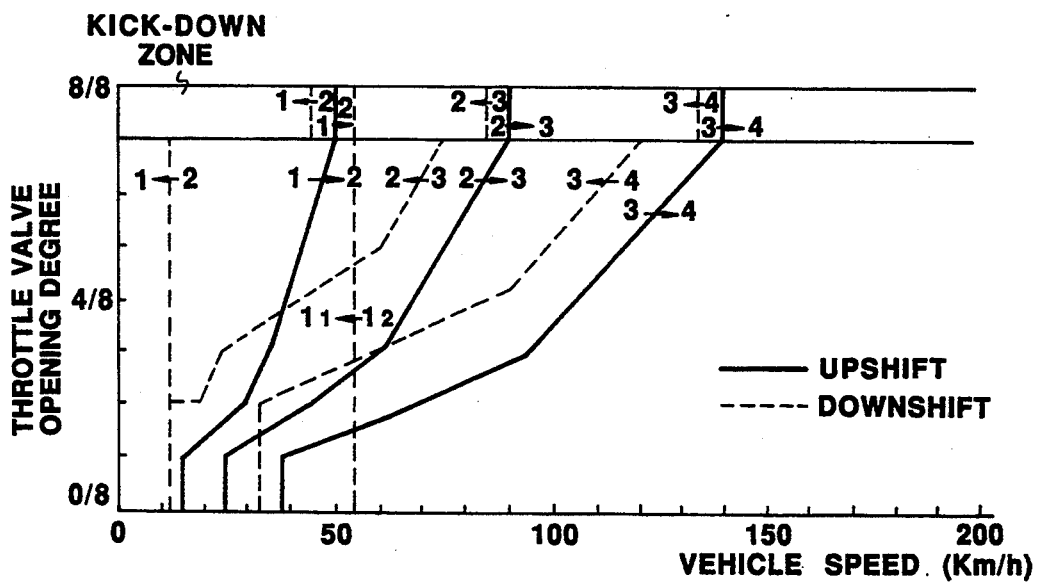
FIG. 4 is a vehicle speed-versus-throttle valve opening degree graph showing a gear shift schedule for a power mode.

When the operation mode selection switch 8 is manually operated by a driver to select the economy mode, the gear shift control is automatically performed according to a gear shift schedule as shown in FIG. 3. On the other hand, when the power mode is selected by the driver, the gear shift control is automatically performed according to a gear shift schedule as shown in FIG. 4. Further, when the hold mode is selected by the driver, the gear shift control is automatically performed according to a gear shift schedule as shown in FIG. 5, except when acceleration is required by the driver, which will be described later in detail.

Figure 5:
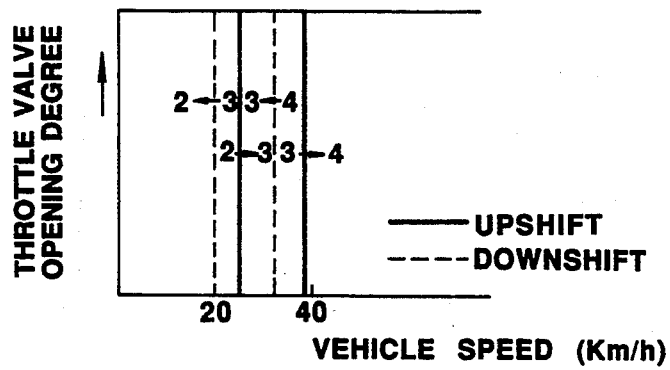
FIG. 5 is a vehicle speed-versus-throttle valve opening degree graph showing a gear shift schedule for a hold mode.

As appreciated from FIGS. 3 to 5, the gear shift schedules of FIGS. 3 and 4 are arranged in terms of a throttle valve opening degree and a vehicle speed, while the gear shift schedule of FIG. 5 is arranged solely in terms of a vehicle speed. Specifically, in the economy or power mode, the gear shift control is executed by the ATCU 5 based on the input data TH and V using the gear shift schedule of FIGS. 3 or 4. In the hold mode, the gear shift control is executed by the ATCU 5 solely based on the input data V using the gear shift schedule of FIG. 5, thus the gear shift is not effected by the detected or monitored engine load, the throttle valve angular position TH.

FIGS. 3 to 5 respectively show the gear shift schedules of the economy, power, and hold modes arranged for a gear shift lever position of the drive range (D-range) with an overdrive. Accordingly, the other ranges, such as, the first and second speed ranges have their own gear shift schedules for the economy, power, and hold modes. For example, in the hold mode of each of the first and second speed ranges, a gear position may be fixed. For example, the gear position in the hold mode for the first speed range may be fixed to the first speed drive and the gear position in the hold mode of the second speed range may be fixed to the second speed drive. Further, the gear position in the hold mode for the D-range may also be fixed to, such as, the third speed drive.

As shown in FIGS. 3 and 4, the power mode allows the gear shift, upshift and downshift to occur at a higher vehicle speed than the economy mode to provide the higher acceleration response. The power mode is scheduled in view of the output characteristics, while the economy mode is scheduled in an economical point of view.

FIG. 2 shows a flowchart of the operation mode control routine to be executed by the ATCU 5 for executing the selected mode, wherein the power mode is executed in place of the hold mode when vehicular acceleration is required by the driver while the hold mode is manually selected.

At a first step 30, a throttle valve opening degree TH indicative of en engine load, a vehicle speed V, and a selected mode SM are read based on the input signals from the respective sensors 6, 7 and 8. Subsequently, at a step 31, it is decided, based on the selected mode SM read at the step 30, whether the hold mode is selected by the driver. If the decision at the step 31 is NO, i.e. the economy or power mode is selected. The routine then goes to a step 32 where the economy or power mode is executed according to the selected mode SM using a known subroutine. The economy or power mode is executed using the gear shift schedule of FIGS. 3 or 4 when the D-range is selected, while another gear shift schedule is used when another range is selected.

If the decision at the step 31 is YES, i.e. the hold mode is selected. The routine then proceeds to a step 33 where a speed dTH of variation in the throttle valve angular position TH, indicative of an accelerator operation speed or an acceleration demand magnitude, is derived from the following equation:

$$dTH/dt = (TH_2 - TH_1)/(t_2 - t_1)$$

where, ($TH_2 - TH_1$) denotes a variation in the throttle valve angular position TH and ($t_2 - t_1$) denotes the time required for that variation.

Subsequently, at a step 34, a criterion value DTH is derived using at least one of $TH_1$, a vehicle speed $V_1$ corresponding to $TH_1$ and a gear position $GP_1$ corresponding to $TH_1$. Alternatively, the criterion value may be derived from at least one of TH, V and GP monitored when the depression of the accelerator is started.

At a step 35, an inquiry is made as to whether a flag HFLG indicative of a release of the hold mode is set or reset. Specifically, the step 35 checks whether the flag HFLG is reset, which symbolizes, for example, whether the hold mode is executed. If the decision at step 35 is YES, in other words the hold mode is executed, then the routine proceeds to a step 36 where dTH derived at the step 33 is compared with the criterion value DTH derived at the step 34. Specifically, the step 36 determines whether dTH is not greater than DTH. If a decision at step 36 is YES, meaning that dTH is not greater than DTH, then the routine goes to a step 37 where the hold mode is executed using the gear shift schedule of FIG. 5 when the D-range is selected or another fixed gear position schedule if another range is selected.

On the other hand, if the decision at the step 36 is NO, meaning dTH is larger than DTH, then the routine goes to a step 38 where the execution of the hold mode is released and the flag HFLG is set at a step 39. As a result, the decision at step 35 in a subsequent execution of this routine will become NO, thereby directing the routine to; a step 40.

At step 40, the power mode is executed using the gear shift schedule of FIG. 4 when D-range is selected. As described above, another gear shift schedule is used when another range is selected.

Subsequently, at a step 41, it is decided whether an instantaneous value of TH read at the step 30 is less than a predetermined threshold value HTH. If the decision at step 41 is YES, then the routine proceeds to a step 42 where a delay time DT is compared with a criterion value DTv. Specifically, the step 42 determines whether the delay time DT is not less than the criterion value DTv. The delay time DT is measured by a counter commencing from a time point when step 41 issues the positive (YES) decision and the criterion value DTv is derived from an instantaneous value of the vehicle speed V.

If the decision at step 42 is YES, meaning the delay time DT is not less than the criterion value DTv, then the routine proceeds to a step 43 where the flag HFLG is reset. As a result, in a subsequent execution of this routine, the decision at step 35 will become YES to allow routine to proceed to the step 36. On the other hand, if the decision at step 42 is NO, then routine repeats the step 42 until the delay time DT is no longer less than the criterion value DTv.

Referring back to the step 41, if the decision at step 41 is NO, then the routine proceeds to a step 44 where a time T is compared with a predetermined maximum time $T_{MAX}$. Specifically, the step 44 determines whether the time T is not less than the predetermined maximum time $T_{MAX}$. The time T is measured by a counter commencing from a time point where the flag HFLG is set at the step 39. If the decision at step 44 is YES, then the routine proceeds to step 43 where the flag HFLG is reset. On the other hand, if decision at the step 44 is NO, then the routine returns to the first step 30. In this case, since the flag HFLG remains set, the decision at step 35 in a subsequent execution of this routine is still NO to continue the execution of the power mode.

The operation mode control system as described above has, for example, the following advantages.

The execution of the power mode while the hold mode is manually selected is released when the instantaneous acceleration demand magnitude is not more than the criterion value to automatically execute the hold mode.

When the acceleration demand magnitude is larger than the criterion value while the hold mode is selected, the power mode is automatically executed in place of the hold mode. Accordingly, the high acceleration response required by the driver is attained.

Since the criterion value DTH is derived from at least one of the monitored engine load, the throttle valve opening degree TH, the monitored vehicle speed V and the monitored gear position GP, an optimum criterion value DTH can be derived for deciding whether the power mode should be executed in place of the hold mode.

Since the preset value HTH is used for deciding whether to continue the power mode, the shift from the power mode to the hold mode is properly executed according to the driver's accelerator operation for deceleration.

Since the criterion time value DTv is derived from the instantaneous vehicle speed V, a time period for continuing the power mode after the throttle valve opening degree TH become less than the criterion value HTH, can be optimumly set according to the instantaneous vehicle speed. Also shock caused by the gear downshift due to the shift from the power mode to the hold mode is effectively prevented.

It should be understood that this invention is not to be limited to the preferred embodiment described above, and that various changes and modifications may be made without departing from the spirit and scope of the invention as defined in the appended claims.

For example, although the throttle valve opening degree TH is used at step 41 for deciding whether to continue the power mode, the speed dTH of variation in the throttle valve angular position, the throttle valve opening degree, may be used in place of the throttle valve opening degree. Specifically, the routine may go to step 42 when an instantaneous value of the speed dTH is less than a criterion speed.

What is claimed is:

1. An operation mode control system for an automatic power transmission, comprising:
   a manually operable mode selection switch for selecting a hold mode in which a gear shift is not effected by a monitored engine load indicative parameter;
   first means for deriving an acceleration demand magnitude while the hold mode is selected by said manually operable mode selection switch, said acceleration demand magnitude being derived from a variation in said monitored engine load indicative parameter;
   second means for comparing said acceleration demand magnitude with a first criterion value, said second means producing a first signal when said acceleration demand magnitude is larger than said first criterion value and a second signal when said acceleration demand magnitude is not more than said first criterion value;

third means for halting execution of the hold mode when said first signal is produced by said second means; and fourth means for releasing said halting of the execution of the hold mode when said second signal is produced by said second means.

2. An operation mode control system for an automatic power transmission, comprising:

a manually operable mode selection switch for selecting a hold mode in which a gear shift is not effected by a monitored engine load indicative parameter;

first means for deriving an acceleration demand magnitude while the hold mode is selected by said manually operable mode selection switch, said acceleration demand magnitude being derived from a variation in said monitored engine load indicative parameter;

second means for comparing said acceleration demand magnitude with a first criterion value, said second means producing a first signal when said acceleration demand magnitude is larger than said first criterion value and a second signal when said acceleration demand magnitude is not more than said first criterion value;

third means for halting execution of the hold mode when said first signal is produced by said second means;

fourth means for comparing said monitored engine load indicative parameter with a second criterion value when the execution of the hold mode is halted by said third means, said fourth means producing a third signal when said monitored engine load indicative parameter is less than said second criterion value; and fifth means for releasing said halting of the execution of the hold mode when said second signal is produced by said second means, said second signal being produced after an elapse of a criterion time from when said fourth means produces said third signal.

3. The operation mode control system as set forth in claim 2, wherein said manually operable mode selection switch selects an operation mode from among the hold mode, an economy mode in which a gear shift is controlled based on said monitored engine load indicative parameter and a monitored vehicle speed indicative parameter, and a power mode in which a gear shift is controlled based on said engine load indicative parameter and said vehicle speed indicative parameter, said power mode allowing the gear shift at a higher vehicle speed than said economy mode, and wherein said third means includes sixth means for executing the power mode during the halting of the execution of the hold mode.

4. The operation mode control system as set forth in claim 2, wherein said first criterion value is sequentially derived from said monitored engine load indicative parameter.

5. The operation mode control system as set forth in claim 2, wherein said criterion time is sequentially derived based on an monitored vehicle speed.

6. The operation mode control system as set forth in claim 2, wherein said monitored engine load indicative parameter is a monitored throttle valve opening degree and said acceleration demand magnitude is a speed of variation in said monitored throttle valve opening degree.

7. The operation mode control system as set forth in claim 2, wherein said fourth means further produces a fourth signal when the monitored engine load indicative parameter is not less than said second criterion value, and wherein said fifth means releases said halting of the execution of the hold mode upon an elapse of a preset maximum time when the fourth means produces said fourth signal.

8. The operation mode control system as set forth in claim 7, wherein said preset maximum time is measured from when the execution of the hold mode is halted.

* * * * *